United States Patent
Krauer et al.

[15] 3,657,731
[45] Apr. 18, 1972

[54] TEMPERATURE DETECTOR FOR AUTOMATICALLY COMPENSATING THE INFLUENCE OF TEMPERATURE UPON ELECTROLYTIC CONDUCTIVITY

[72] Inventors: Werner Krauer; Alfred Martinelli, both of Zurich; Friedrich Oehme, Bassersdorf, all of Switzerland

[73] Assignee: Polymetron Ltd., Glattbrugg, Switzerland

[22] Filed: Nov. 17, 1969

[21] Appl. No.: 877,297

[30] Foreign Application Priority Data

Apr. 24, 1969 Switzerland ............................6237/69

[52] U.S. Cl. .........................................................324/30 R
[51] Int. Cl. ......................................................G01n 27/42
[58] Field of Search ............................324/30 R, 30 B, 65 R

[56] References Cited
UNITED STATES PATENTS 3,457,501 7/1969 Ingram......................................324/30
2,505,936 5/1950 Behn......................................324/30 B
3,373,351 3/1968 Rak........................................324/30 B Primary Examiner—Michael J. Lynch
Attorney—Craig, Antonelli & Hill

[57] ABSTRACT

A temperature detector for a conductivity-measuring cell having a heat-sensitive element which has electrical properties that very in accordance with temperature. The heat-sensitive element is inserted in a bore of an electrode of the conductivity-measuring cell and is not in direct contact with the sample liquid. A metal beaker is first inserted in the electrode, preferably made of graphite, and a small diameter metal tube with a cap is located above the metal beaker. A high thermal conductivity paste is inserted in the space between the bore of the electrode and the metal beaker. The heat-sensitive element can be in the form of a removable cartridge and can consist, for example, of a semiconductor or a platinum resistance thermometer.

19 Claims, 3 Drawing Figures

Patented April 18, 1972

3,657,731

TEMPERATURE DETECTOR FOR AUTOMATICALLY COMPENSATING THE INFLUENCE OF TEMPERATURE UPON ELECTROLYTIC CONDUCTIVITY

BACKGROUND OF THE INVENTION

The present invention relates to a temperature detector for automatically compensating the influence of temperature upon electrolytic conductivity, and more particularly, to a heat-sensitive detector which changes its electrical properties in dependence upon temperature and which is in at least indirect contact with at least one electrode in a conductivity-measuring cell without ever being in direct contact with the sample liquid.

Conductivity measurements are frequently made both on a laboratory scale and on a commercial scale. The results are preferably used for determining the concentration of electrolyte solutions. Measurements of this type require knowledge of the dependence of conductivity upon the concentration of the electrolyte in question. To this end, it is possible to resort to the figures which are extensively available in the literature, or alternatively, the apparatus consisting of a measuring cell and a measuring instrument which is calibrated with solutions whose concentration is known.

In making measurements of the aforementioned type, it should be kept in mind that the measured conductivity is governed to a large extent by the temperature of the solution. A positive temperature coefficient is practically always within the limits of from about 0.5 to 5 percent per degree centigrade. The chemical composition of the dissolved electrolyte has the greatest influence upon the temperature coefficient.

In order to be able to make a correct measurement of concentration, especially on a large commercial scale, measurements have to be taken so as to automatically compensate for the influence of temperature.

Conventional methods for the automatic compensation of temperature are distinguished by the fact that the temperature of the sample is measured by means of a thermometer probe. This temperature probe usually is a temperature detector which changes its resistance in dependence on the temperature. Examples of such detectors include NTC-resistors or resistance thermometers.

In switching terms, this change in resistance is utilized in such a way that the conductivity which increases with increasing temperature and which in the absence of temperature compensation would give the impression of an increase in concentration, is automatically compensated through the simultaneous change in the resistance of the temperature detector. The indicator of the conductivity-measuring instrument therefore remains at the figure corresponding to the prevailing concentration independent of the temperature of the sample. In the past, it has been the standard practice either to immerse the temperature detector in the sample completely separated from the conductivity-measuring cell or even to combine it with the measuring cell so as to establish direct contact between the sample and the temperature detector.

The disadvantage of this procedure is that the temperature detector lies in the cross-section of the measuring cell, especially in the case of conductivity-measuring cells for flow through measurement. Not only does this arrangement complicate the cleaning of the cell, which is frequently necessary under operating conditions, being accomplished, for example, by mechanical methods such as brushing, but this arrangement also involves the danger of damage to the temperature detector itself.

SUMMARY OF THE INVENTION

It is the aim of the present invention to provide a temperature detector of the aforementioned type, which has a heat-sensitive element that is not in direct contact with the sample liquid.

The underlying problems are solved in accordance with the present invention by constructing the heat-sensitive element which changes its electrical properties in dependence upon the temperature so that it is in at least indirect contact with at least one of the electrodes in the conductivity-measuring cell without ever being in direct contact with the sample liquid.

The electrodes of the conductivity-measuring cell are preferably made of graphite so that they are able to assume the temperature of the same liquid to be monitored without almost any delay because of the outstanding thermal conductivity of graphite.

The heat-sensitive element can be readily fitted into a cartridge which can be inserted into a corresponding opening in the graphite electrode. In order to ensure effective heat transfer between the electrode and the heat-sensitive element without, at the same time, having to provide a correspondingly narrow fit between the bore and cartridge, it is particularly advantageous to fill the space between the opening in the electrode and the heat-sensitive element with a high thermal conductivity paste. This also allows compensation for differences in diameter between different heat-sensitive elements which are to be inserted into the same electrode.

Replacement of the heat-sensitive element is usually necessary because these heat-sensitive elements are basically constructed of semiconductor components which are subject to gradual aging. The result is that initially accurate temperature compensation becomes increasingly more faulty and the heat-sensitive elements have to be periodically replaced. Further, replacement of the heat-sensitive elements is always necessary in cases where the automatic temperature compensation has to be adapted to another temperature coefficient of conductivity.

Accordingly, it is an object of the present invention to provide a temperature detector which avoids by simple means the shortcomings and disadvantages encountered in the prior art.

Another object of the present invention is to provide a temperature detector which is not in direct contact with the sample liquid, thus avoiding the danger of damage to the temperature detector.

A further object of the present invention is to provide a temperature detector arrangement, wherein differences in diameter between different heat-sensitive elements can be compensated for when being inserted in the same electrode.

A still further object of the present invention resides in the fact that the heat-sensitive element can be replaced after it has become faulty when the temperature coefficient of conductivity has changed.

BRIEF DESCRIPTION OF THE DRAWINGS

These and further objects, features and advantages of the present invention will become more apparent from the following description when taken in connection with the accompanying drawings which show, for purposes of illustration only, an embodiment in accordance with the present invention, and wherein.

DETAILED DESCRIPTION OF THE DRAWINGS

Figure 1:
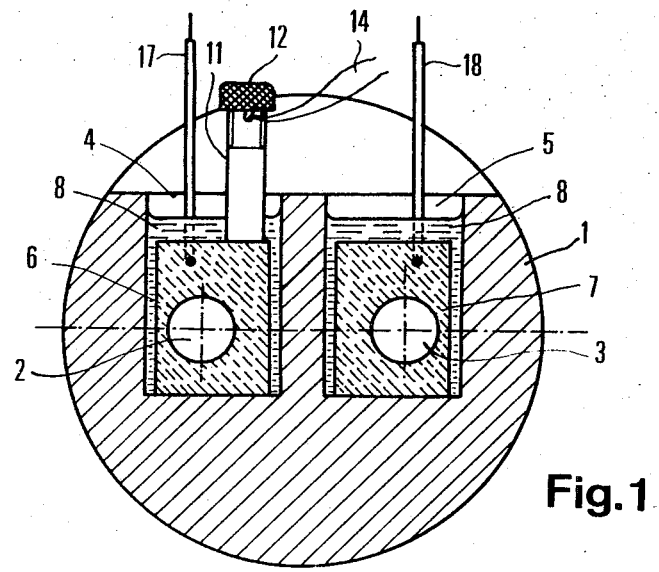
FIG. 1 is a cross-sectional view through a conductivity-measuring cell with a temperature detector in accordance with the present invention inserted into it.
Figure 2:
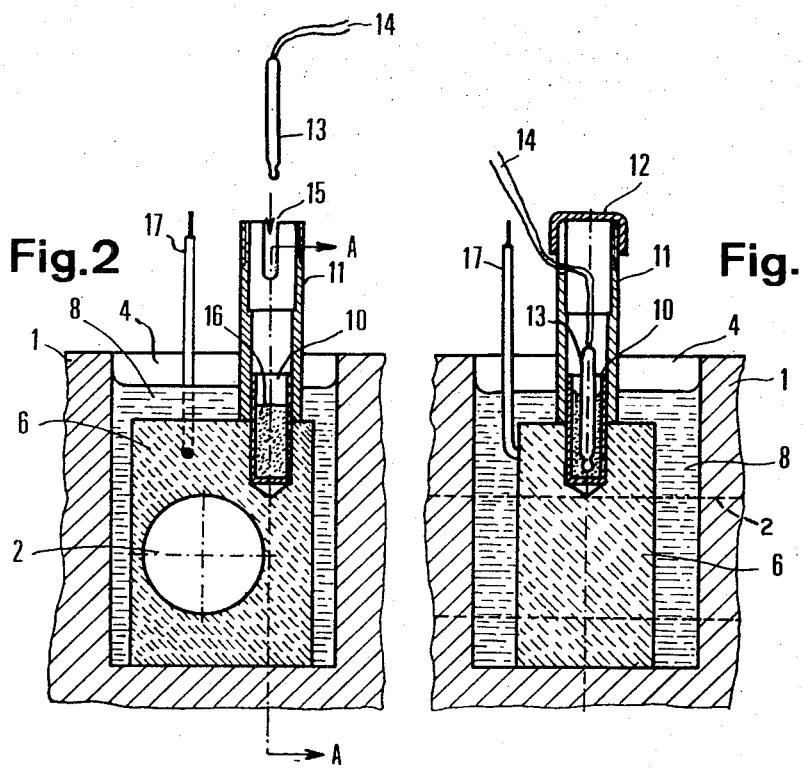
FIG. 2 is a partial cross-sectional view on an enlarged scale showing in greater detail the construction of a portion of the conductivity-measuring cell of FIG. 1.
Figure 3:
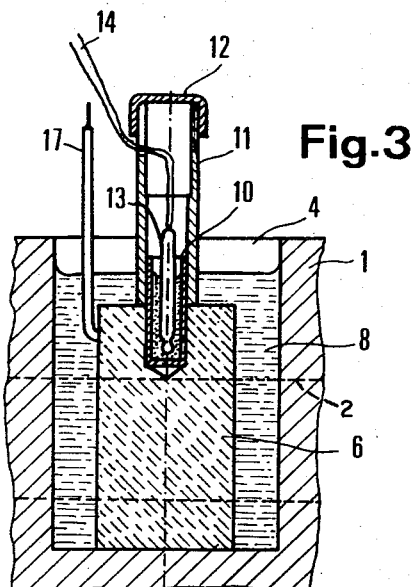
FIG. 3 is a partial longitudinal cross-section along line A—A of FIG. 2 showing the installed temperature detector.

Referring now to the drawing and, in particular, to FIG. 1, there is illustrated a conductivity-measuring cell which comprises a prismatic body 1 having two longitudinal ducts 2, 3. Each of these ducts has a transverse bore 4, 5, respectively, into which graphite electrodes 6, 7 are inserted. The gaps between the electrodes and the transverse bore 4, 5 are filled with cast resin 8 which anchors the electrodes in the conductivity-measuring cell. The ducts 2, 3 have a constant cross-section through the electrodes 6, 7 and the cast resin filling 8 so that the stream of sample liquid is able to flow through without any interference. The contact surfaces between the electrode and the liquid are thus each formed by a portion of the duct walls. Downleads 17, 18 act as connections between the electrodes 6, 7 and an associated measuring instrument.

Because of the high thermal conductivity of the graphite electrode, the temperature of the graphite electrode is determined in accordance with the present invention by guiding the temperature detector into a bore drilled in the electrode. In order to obtain, at the same time, adequate mechanical strength and easy replaceability of the actual temperature-sensitive element, a metal beaker 10, made preferably of aluminum, is initially inserted into the bore formed in the electrode. This metal beaker 10 is surrounded by a small-diameter tube 11 and may optionally be connected with it, for example, by conventional connecting means such as an adhesive. At its upper end, this tube 11 can be closed by a cap 12 and a slot 15 can be provided in the tube for the downleads 14.

The actual heat-sensitive element is accommodated in the lower end of a short rod or bar 13, while connecting wires 14 come in from above. The small rod 13 is then inserted through the tube 11 into the metal beaker 10 which is filled with a high thermal conductivity paste 16 so that the heat will be effectively transferred again from the wall of the metal beaker to the heat-sensitive element. In this connection, the heat-sensitive element can be made of a platinum resistance thermometer with electrical properties that are variable with temperature. In addition, the paste 16 always guarantees full contact even where the dimensions of the heat-sensitive element are different due to their replacement.

The temperature of the sample liquid circulating in the ducts 2, 3 is thus indirectly determined in that is the temperature of the electrode that is actually measured. This has the advantage that no probes project into the ducts so that the ducts can be easily cleaned without any danger of damage to the heat-sensitive element.

While we have shown and described only one embodiment in accordance with the present invention, it understood that the same is not limited thereto but is susceptible of numerous changes and modifications as known to a person skilled in the art, and we, therefore, do not wish to be limited to the details shown and described herein but intend to cover all such changes and modifications as encompassed by the scope of the invention.

We claim:

1. A conductivity measuring cell including apparatus for detecting the temperature of the fluid, comprising:
    a plurality of conductivity electrodes in direct contact with said fluid, each having a passage therethrough for permitting said fluid to pass therethrough and transmit the temperature thereof through said electrodes;
    first means partially surrounding the exterior of each of said electrodes and maintaining said electrodes in a fixed spacial relation;
    heat-sensitive means for measuring the temperature of said fluid passing through said electrodes; and
    second means, physically contacting one of said electrodes at a portion of the surface of said one electrode which is not surrounded by said first means, for detachably affixing said heat sensitive means to said one electrode, so that said heat-sensitive means may be readily removed from said electrode without disassembling said measuring cell, while said fluid is flowing through the passage in said one electrode. 1

2. A measuring cell according to claim 1, wherein at least one of said electrodes is made substantially of graphite.

3. A measuring cell according to claim 1, wherein said one electrode has a first bore therein having an axis transverse to the axis of the fluid passage therethrough, into which said heat-sensitive means is inserted so as to be in thermal contact with said electrode.

4. A measuring cell according to claim 3, wherein said second means includes a metal beaker provided in said bore of said first one electrode and a tube surrounding a portion of said metal beaker, said heat-sensitive means being inserted in said metal beaker.

5. A measuring cell according to claim 4, wherein said second means further includes a high thermal conductivity paste provided in a space between said heat-sensitive means and said metal beaker.

6. A measuring cell according to claim 5, wherein said heat-sensitive means consists of a semiconductor having electrical properties adapted to vary with temperature.

7. A measuring cell according to claim 5, wherein said heat-sensitive means consists of a platinum resistance thermometer having electrical properties adapted to vary with temperature.

8. A measuring cell according to claim 7, wherein said one electrode is made substantially of graphite.

9. A measuring cell according to claim 1, wherein said heat-sensitive means consists of a semiconductor having electrical properties adapted to vary with temperature.

10. A measuring cell according to claim 1, wherein said heat-sensitive means consists of a platinum resistance thermometer having electrical properties adapted to vary with temperature.

11. A measuring cell according to claim 1, wherein said first means is formed of a prismatic body having a plurality of longitudinal ducts for permitting the passage of said fluid therethrough and wherein each of said longitudinal ducts communicates with and has the same cross-section as each of the passages through each of said electrodes.

12. A measuring cell according to claim 5, wherein said tube further includes a slot at an end portion thereof for the passage of connecting wires to said heat sensitive means and a cap fitted over said portion for closing said tube.

13. A measuring cell according to claim 3, wherein said first means is formed of a prismatic body having a plurality of longitudinal duct for permitting the passage of said fluid therethrough and wherein each of said longitudinal ducts communicates with and has the same cross-section as the passage through each respective electrode, and wherein said plurality of electrodes comprise a first electrode in which said heat-sensitive means is disposed and a second electrode, each of said first and second electrodes being disposed in respective second and third bores in said prismatic body, said respective second and third bores being transverse to the axis of said longitudinal ducts and wherein said plurality of longitudinal ducts comprise respective first and second longitudinal ducts passing through said first and second electrodes.

14. A measuring cell according to claim 13, further including a cast resin substantially filling the portions of said second and third transverse bores between the surfaces of said bores and said electrodes for securing said electrodes therein, while having respective passages therethrough for ensuring communication between said longitudinal ducts and said passages through said electrodes.

15. A measuring cell according to claim 14, wherein said second means includes a metal beaker provided in said first bore in said one electrode and a tube surrounding a portion of said metal beaker, said heat-sensitive means being inserted in said metal beaker.

16. A measuring cell according to claim 15, wherein a high thermal conductivity paste is provided in a space between said heat-sensitive means and said metal beaker.

17. A measuring cell according to claim 16, wherein said tube further includes a slot at an end portion thereof for the passage of connecting wires to said heat-sensitive means and a cap fitted over said end portion for closing said tube.

18. A measuring cell according to claim 17, further including respective down lead wires passing through said transverse bores in said prismatic body for providing direct electrical connections to said electrodes.

19. A measuring cell according to claim 18, wherein said electrodes are made substantially of graphite.

* * * * *